G. L. PATTERSON.
ELECTRIC BATTERY HOLDER AND BATTERY.
APPLICATION FILED APR. 18, 1908.
911,522.
Patented Feb. 2, 1909.
2 SHEETS—SHEET 1.
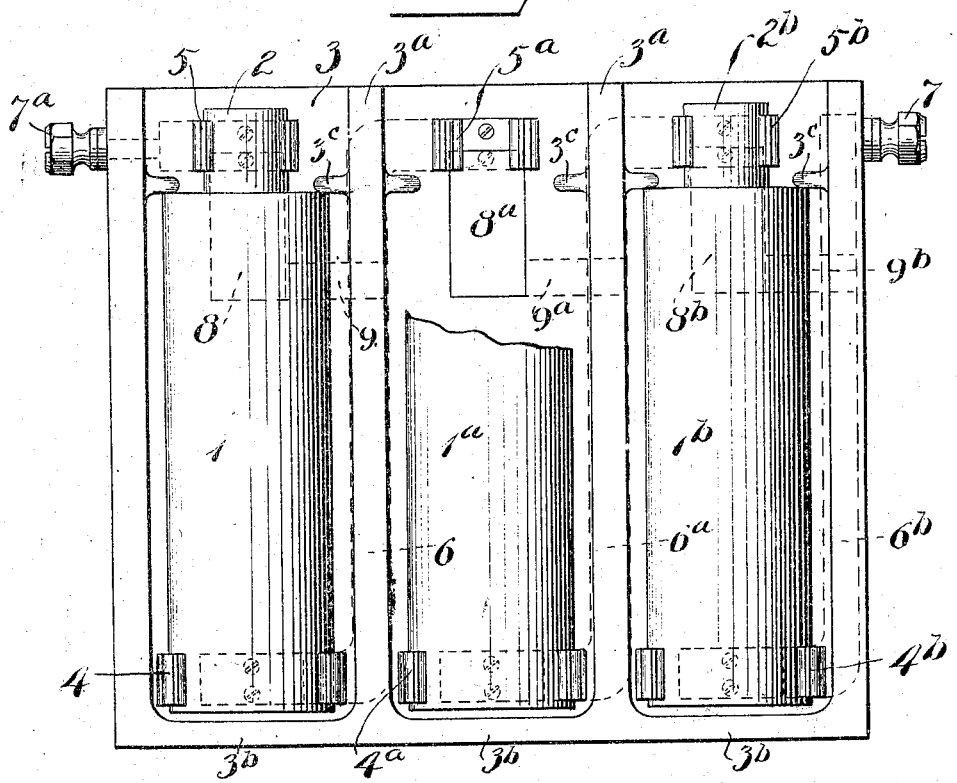
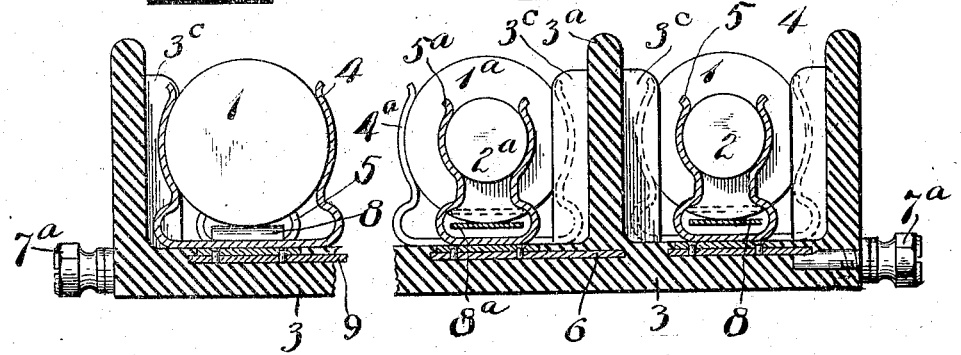
Witnesses:
Inventor
G. L. PATTERSON
By his Attorneys

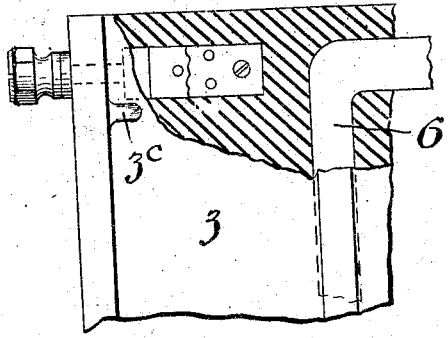
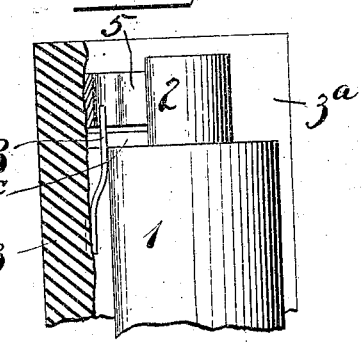
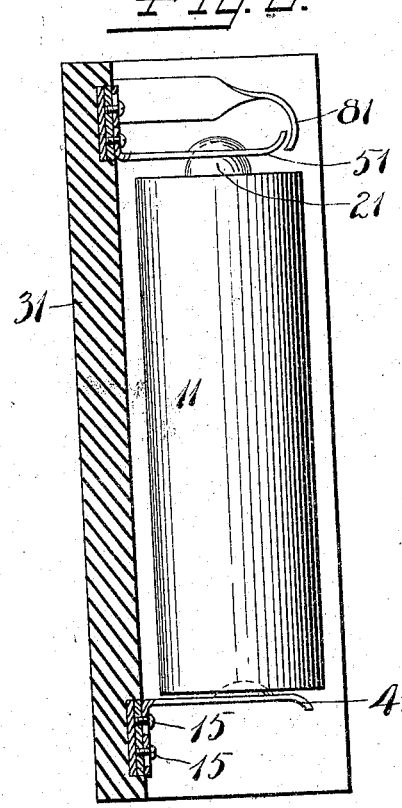
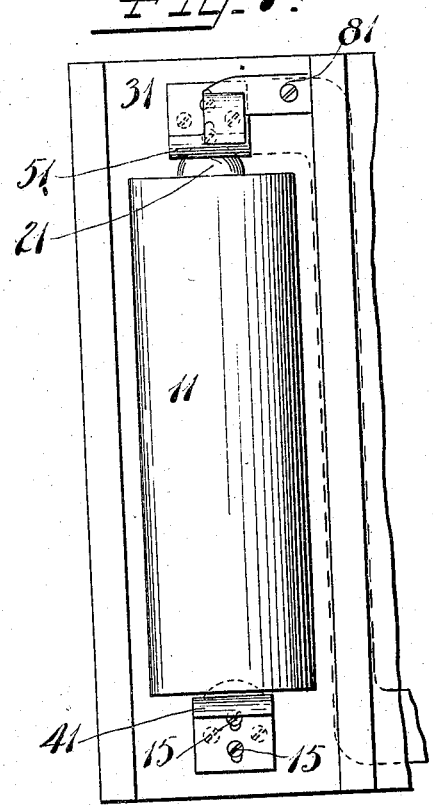

UNITED STATES PATENT OFFICE.

GEORGE LEWIS PATTERSON, OF NEW YORK, N. Y., ASSIGNOR TO ALICE C. PATTERSON, OF NEW YORK, N. Y.

ELECTRIC-BATTERY HOLDER AND BATTERY.

No. 911,522.   Specification of Letters Patent.   Patented Feb. 2, 1909.

Application filed April 18, 1908. Serial No. 427,813.

*To all whom it may concern:*

Be it known that I, GEORGE L. PATTERSON, citizen of the United States, residing in the city, county, and State of New York, have invented certain new and useful Improvements in Electric-Battery Holders and Batteries, of which the following is a full, clear, and exact description.

My invention relates to certain new and useful improvements in electric battery constructions and in holders therefor.

The main object of the invention is to provide a simple and effective means whereby the battery may be easily and quickly put into circuit or removed therefrom. By this means fresh batteries may be easily substituted for old ones. It eliminates the necessity of the usual binding-post terminals on the batteries, the positive and negative electrodes thereof being automatically connected with the circuit wires of the holder by the mere act of inserting the cell. The holder is of a type that may be easily and quickly applied to a side wall, where access may be easily had, and in which position the cells and various terminal connections are out of the way and safe. These and other advantages will be apparent to the mechanic skilled in the art from a reading of the following description.

In the accompanying drawings Figure 1 is a front elevation of my improved battery holder. Fig. 2 is a view from the under side of the battery cell at the left hand of Fig. 1, certain associated parts being in section. Fig. 3 is a top view of the two cells at the left of Fig. 1, certain parts being in section. Fig. 4 is a view of a portion of the holder shown in Fig. 1, at the upper right hand corner, said holder being partly in section and broken away. Fig. 5 is a side elevation of the upper end of one of the cells, certain parts being shown in section. Fig. 6 is a side elevation of a cell of modified construction, certain parts being shown in section. Fig. 7 is a front view of the part shown in Fig. 6.

I will first refer to Figs. 1 to 5. In these figures 1—1$^a$—1$^b$ are battery cells of the ordinary dry battery variety. One of the electrodes of each cell is the battery cup, as usual. The other electrode projects from the waxed or sealed end of the battery cup. The latter electrodes are indicated at 2—2$^a$—2$^b$ respectively. The holder may be adapted to a single battery cell or unit, or to a plurality of such units. As shown, three cells or units are employed and the mechanical and electrical connections are such that the mere act of inserting a cell in place in the holder puts the same in the circuit. Where a plurality of cells are employed these cells are coupled in series. As shown, where a plurality of cells are employed, the removal of one will not interrupt the circuit, although this arrangement for preventing the interruption of the circuit is not essential to the invention in its broadest aspect. The battery cup of each cell is preferably cylindrical in form, while the exposed end of each electrode 2—2$^a$—2$^b$ is also preferably cylindrical. By making the cup and the exposed end electrode of different diameters, it is impossible to reverse the polarity of the cell when it is inserted in the holder, a feature of substantial importance and value.

The holder comprises a suitable main body or frame 3, which is formed of suitable material, preferably insulating material. This frame, in the form shown, has the forwardly projecting partitions or semi-partitions 3$^a$, the space between each partition being provided for the reception of a single battery unit.

4—4$^a$—4$^b$ are clip-like devices arranged to receive the cup of the cells 1—1$^a$—1$^b$ respectively. 5—5$^a$—5$^b$ are clip-like devices arranged to receive the electrodes 2—2$^a$—2$^b$ respectively. In the particular form shown, these clips are formed of spring material open at one side and arranged to partially embrace each cell, each of said cells being forced into said clips sidewise until it is firmly embraced thereby, and supported near both ends. The frame 3 preferably has a stop 3$^b$ directly below each cell to prevent the cell from slipping down out of the embrace of the clips, by reason of any excessive vibration or from any other cause. The clips for holding each cell are parts of the circuit system, there being a suitable electrical connector 6 leading from a clip 4 to clip 5$^a$; another 6$^a$ leading from clip 4$^a$ to clip 5$^b$; and another 6$^b$ leading from clip 4$^b$ to the external binding post 7. 7$^a$ is another binding post electrically connected with clip 5.

Thus far described, it will be seen that when the cell units 1—1$^a$—1$^b$ are in place in the holder, the current will flow from binding post 7ª through the several cells successively to binding post 7, or vice versa. With such an equipment the user may quickly substitute a fresh cell for an exhausted one.

3$^b$—3$^c$ are upper stops of insulating material above each battery cell, arranged to prevent the cells from being raised so high as to short circuit through terminals 5—5$^a$—5$^b$. The stops 3$^b$—3$^c$ are only essential in the event the holder is liable to severe vibration, although they are by preference provided in each case.

In the preferred form of the invention, I provide automatic circuit coupling devices, whereby the removal of any one or all of the cells will not interrupt the circuit. To that end, I provide at a suitable point a circuit closer which automatically closes the circuit that would otherwise be broken the instant its respective battery cell is removed, the presence of the cell operating the circuit closer so as to disrupt the circuit so far as it would otherwise be closed thereby. This circuit closer construction I will now explain. 8—8$^a$—8$^b$ represent the circuit closers arranged to be actuated respectively by the cells 1—1$^a$—1$^b$. In the particular form shown, each one of the circuit closers is in the form of a spring normally adapted to contact with one of the clips 5—5$^a$—5$^b$. The closer 8$^a$ is electrically connected with the clip 5$^a$ in any suitable manner, for example, through the medium of the extension 9 leading to the connector 6. The closer 8 is electrically connected with the clip 5 through extension 9$^a$ in electrical connection with the connector 6$^a$; while the closer 8$^b$ is electrically connected with the binding-post 7 through the extension 9$^b$ in electrical connection with the connector 6$^b$. Each closer 8—8$^a$—8$^b$ may be carried by the frame 3 and so placed relatively to the largest diameter of the cell that when the cell is in place it is forced back out of circuit, as shown in solid lines Fig. 3. In this figure, the position of the circuit closer 8, shown in dotted lines, is the position in which said closer stands when the cell 1 is absent. While the closer 8 is in this position, current entering at the binding-post 7$^a$ would go to terminal 5 and thence through closer 8, extension 9 and connector 6 to clip 5$^a$, so that the circuit through the units 1$^a$—1$^b$ would still be maintained. The operation of each circuit closer is the same.

Now referring to Figs. 6 and 7, the modification shown relates particularly to the form of cell-engaging clips. In this instance, instead of embracing the sides of the cells, the same are embraced at their ends. 41 represents a lower clip and 51 an upper clip. 11 represents the cupped body of the battery cell and 21 represents the end electrode. In this particular form, the end electrode 21 is rounded, while the clip 51 is recessed to receive said rounded electrode 21. The lower clip 41 is provided with a rounded upward projection, while the lower end of the battery 11 may be slightly recessed to receive said projection. The circuit connection from the binding posts (not shown) may be made with the clips 41—51, respectively, in the manner heretofore described. In this case, the circuit closer should be modified properly to cooperate with one or the other of the clips 41 or 51. For example, 81 represents the circuit closer arranged to electrically connect with the clip 51 when the battery is removed. When, however, the battery is present, as shown in Figs. 6 and 7, the clip 51 moves away from the closer 81. In this modification, the circuit closer need not be movable, the movement necessary to open or close the circuit through the closer 81 being wholly in the clip 51.

The clips, in all instances, may be made adjustable, one form of adjustment being shown in Figs. 6 and 7, in which the base of the clip 41 is slotted, while adjusting screws 15—15 pass through said slots to a suitable threaded abutment on the frame 31. A similar arrangement may be provided for clip 51. By varying the dimensions of the parts, the clips may be adjusted to any desired extent, whereby, if desired, batteries of substantially different sizes may be employed in a single holder.

In actual practice, the slightest vibration of the apparatus will cause a rubbing action between the clips and the cell tending to wear away any corrosion and keep the contacts bright and clean, thus insuring the greatest efficiency, a feature of recognized importance and value in the use of batteries of this character.

The particular form of the clips or cell retainers may, of course, be modified at will so long as they accomplish the purpose of permitting the cell to be quickly attached or detached in substantially the manner herein described, whereby a quick and positive electrical connection is made between the electrodes and the cell and the circuit wires or connections.

By this invention the clips, which constitute the terminals, are so far apart that short-circuiting is practically impossible. By making the holding connection with each cell partly at or near one end and partly at or near the opposite end, the battery will be very effectively held against displacement.

By operating the circuit closer in the manner shown in Figs. 1 to 5, all possibility of short-circuiting is prevented. In those figures it is shown that each circuit closer is designed to close the circuit through that terminal clip designed to engage the central electrode of each cell. The closer is pressed out of engagement with said clip by the cupped body of the cell. Ordinarily, even if pains were taken to insulate this part of the cell from the circuit closer, no harm would come if such insulation were ineffective, because in that event the circuit closer would simply supplement the conductor designed to take current from this particular electrode to the opposite electrode of the next series. It should be stated, of course, that in case the cells are provided with the usual paper jacket, the same should be removed wherever the terminal clips are designed to engage the cupped portion of said cell. Indeed, in use the support is so effective that the paper covering for each cell may be entirely removed, there being no danger of short-circuiting, since displacement of either the upper or lower end of the cell is guarded against by the support furnished for both ends. While it is preferable to have the positive and negative terminal clips of different shape or size, it is impossible to reverse the polarity of the cell by an incorrect placing of the cell in the holder. This, of course, is not absolutely essential.

What I claim is:

In an apparatus of the character described, a holder, devices carried thereby arranged to make electrical and mechanical connection with a plurality of batteries, said devices including two sets of terminals, both terminals of one set being electrically connected with one of the terminals of a second set when no battery is in engagement with the first-mentioned set, and a circuit closer in the first-mentioned set adapted to be operated by a lateral movement of the battery when the latter is inserted in or removed from the holder.

GEORGE LEWIS PATTERSON.

Witnesses:
R. C. MITCHELL,
R. W. POWELL.